US008306272B2

(12) United States Patent
Reinpoldt, III

(10) Patent No.: US 8,306,272 B2
(45) Date of Patent: Nov. 6, 2012

(54) METHOD AND SYSTEM FOR DYNAMICALLY ALTERING THE ANALYSIS METHODOLOGY OF MILLIMETER WAVE IMAGERY IN RESPONSE TO THE RANGE AND DIRECTION OF MOTION OF A SUBJECT

(75) Inventor: Willem H. Reinpoldt, III, Windermere, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 901 days.

(21) Appl. No.: 12/131,539

(22) Filed: Jun. 2, 2008

(65) Prior Publication Data

US 2008/0298640 A1    Dec. 4, 2008

Related U.S. Application Data

(60) Provisional application No. 60/941,023, filed on May 31, 2007.

(51) Int. Cl.
*G06K 9/00*  (2006.01)
*C25D 11/18*  (2006.01)
*G01S 13/00*  (2006.01)

(52) U.S. Cl. .......... 382/106; 382/103; 205/203; 342/22

(58) Field of Classification Search .................. None
See application file for complete search history.

(56) References Cited

U.S. PATENT DOCUMENTS

| 7,346,226 | B2 * | 3/2008 | Shyshkin ................... 382/275 |
|---|---|---|---|
| 2002/0131056 | A1 * | 9/2002 | Fujii et al. ................... 356/608 |
| 2005/0104603 | A1 * | 5/2005 | Peschmann et al. .......... 324/637 |
| 2005/0169500 | A1 * | 8/2005 | Takahashi et al. ............ 382/104 |
| 2008/0043102 | A1 * | 2/2008 | Rowe et al. .................. 348/143 |
| 2008/0240578 | A1 * | 10/2008 | Gudmundson et al. ....... 382/218 |
| 2010/0214150 | A1 * | 8/2010 | Lovberg et al. ................ 342/22 |

\* cited by examiner

*Primary Examiner* — Andrew W Johns
*Assistant Examiner* — David F Dunphy
(74) *Attorney, Agent, or Firm* — Holland & Hart LLP

(57) ABSTRACT

A system and method for dynamically altering the analysis methodology of millimeter wave imagery in response to the range and direction of motion of a subject is disclosed. In a particular embodiment, an imaging zone of a scene is scanned using at least one millimeter wave camera during a current time frame and a CPU is used to dynamically process millimeter wave imagery of the imaging zone in response to detecting a range and direction of motion of the subject during a previous time frame. In addition, values of a grid of discrete cells are calculated representing the millimeter wave energy associated with the current time frame, which are then compared to values from a grid of corresponding discrete cells associated with the previous time frame in determining a current range and direction of the subject.

20 Claims, 3 Drawing Sheets

Figure 1:
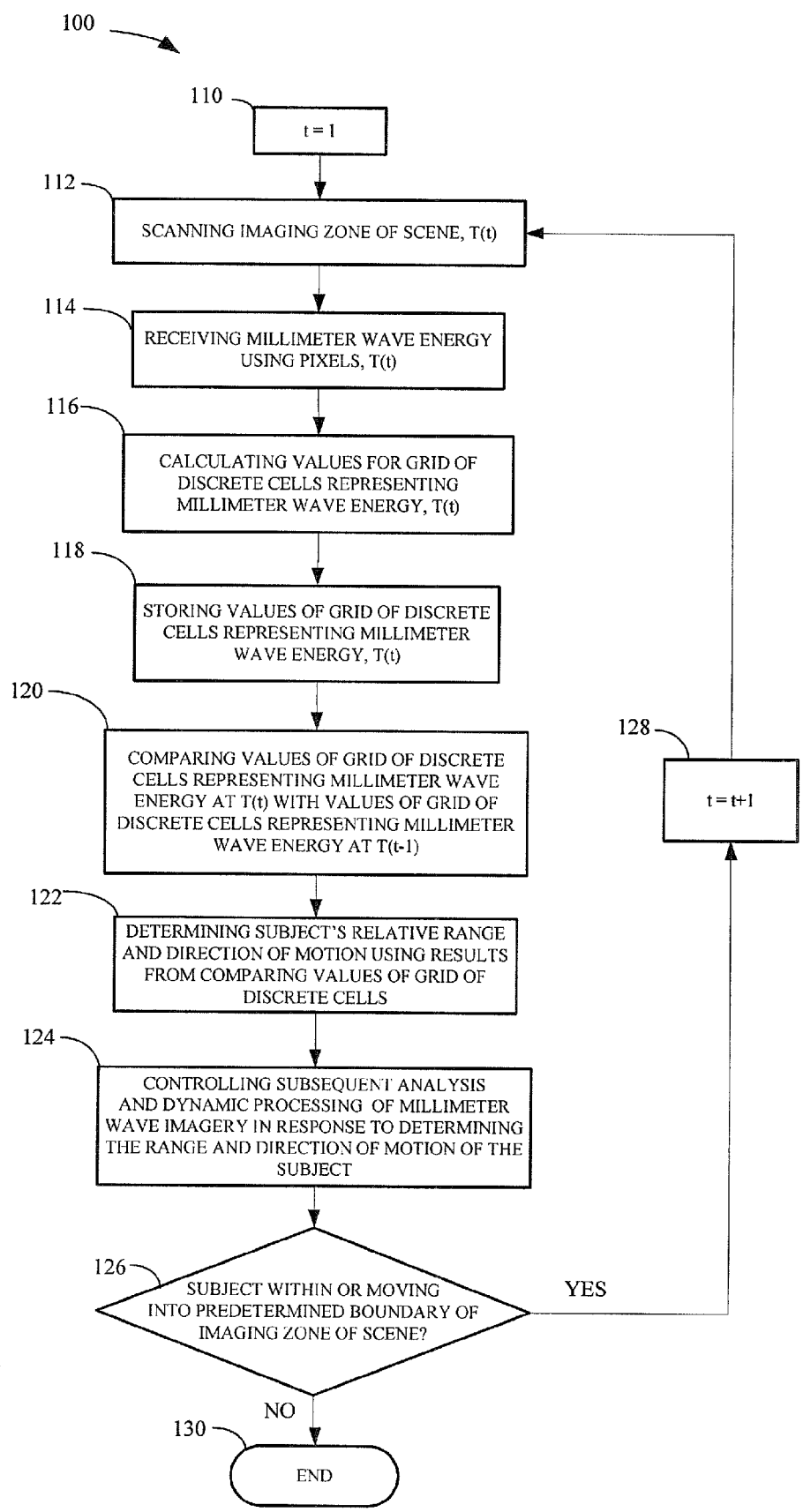

METHOD AND SYSTEM FOR DYNAMICALLY ALTERING THE ANALYSIS METHODOLOGY OF MILLIMETER WAVE IMAGERY IN RESPONSE TO THE RANGE AND DIRECTION OF MOTION OF A SUBJECT

I. CROSS REFERENCE TO RELATED APPLICATIONS

This application claims the benefit of U.S. Provisional Application No. 60/941,023 filed May 31, 2007. The disclosure of the provisional application is incorporated herein by reference.

II. FIELD

The present invention relates in general to the field of concealed object detection systems using millimeter wave imagery, and in particular to a method and system for dynamically altering the analysis methodology of millimeter wave imagery in response to the range and direction of motion of a subject.

III. DESCRIPTION OF RELATED ART

A passive millimeter wave camera has the ability to detect and image objects hidden under clothing using millimeter wave imagery. The passive millimeter wave camera detects radiation that is given off by all objects. The technology works by contrasting the millimeter wave signature of the human body, which is warm and reflective, against that of a gun, knife or other contraband. Those objects appear darker or lighter because of the differences in temperature, hence, millimeter wave energy, between the human body and the inanimate objects.

An object-based scene is generated for viewing on a video monitor with individual objects having spatial and temporal relationships. The objects may be created in any number of ways, including signals from a passive millimeter wave camera and/or signals from a visible spectrum video camera.

However, no adequate method or system has been provided that reduces the probability of incorrect composite image analysis caused by a subject too far or close to from the millimeter wave or visible spectrum cameras. Accordingly, there is a need in the relevant art for a system and method that has the ability to detect the range and direction of motion of a subject within the scene to improve the focus of the millimeter wave imagery.

There is also a need in the art for a method and system for automatically focusing millimeter wave imagery that eliminates the need for ancillary equipment such as pressure-sensitive floor mats, light beams, ultrasonic motion detectors or the like to enable or disable image analysis, and hence the concealed object detection process.

Another need exists in the art for a system and method for dynamically altering the analysis methodology of millimeter wave imagery in response to the range and direction of motion of a subject that reduces the probability of incorrect image analysis caused by the subject moving in an unexpected fashion in front of the cameras.

There is also a need in the art for a system and method for dynamically processing millimeter wave imagery in response to detecting a range and direction of motion of a subject that allows for a real-time change in concealed object detection methodology according to the subject's range and motion.

There is also a need in the art for a system and method for dynamically altering the analysis methodology of millimeter wave imagery in response to the range and direction of motion of a subject that provides the ability to perform object triangulation on images produced from dissimilar imagers such as visible spectrum color cameras and millimeter wave cameras.

Another need exists in the art for a system and method for dynamically altering the analysis methodology of millimeter wave imagery in response to the range and direction of motion of a subject that improves the reliability of image analysis by performing multiple analyses on the same scene as viewed by different imagers and/or different camera locations/angles.

Another need exists in the art for a system a method for automatically controlling the actions of automated object detection algorithms in response to detecting a range and direction of motion of a subject that improves, extends or curtails subsequent image analysis performed on the imagery.

However, in view of the prior art at the time the present invention was made, it was not obvious to those of ordinary skill in the pertinent art how the identified needs could be fulfilled.

IV. SUMMARY

In a particular embodiment, a method for dynamically altering the analysis methodology of millimeter wave imagery in response to the range and direction of motion of a subject is disclosed. The method includes scanning an imaging zone of a scene using at least one millimeter wave camera during a current time frame and using a CPU to dynamically process millimeter wave energy of the imaging zone in response to detecting a range and direction of motion of the subject during a previous time frame. In addition, the method includes calculating values of a grid of discrete cells representing the millimeter wave energy associated with the current time frame and comparing to the values from a grid of corresponding discrete cells associated with the previous time frame in determining a current range and direction of the subject.

In another particular embodiment, a system includes computer hardware, software and external devices such as frame buffers, millimeter wave sensor controllers, hard disk drives and the like. The system performs triangulation on images produced from the dissimilar sources such as visible spectrum color cameras, visible grayscale cameras, millimeter wave cameras, infrared cameras, etc., to generate automatically focused composite images. Also, a means is provided to evaluate the imagery in the computer memory and determine the presence/absence of a person (subject).

One particular advantage provided by the embodiments of the system and method for dynamically altering the analysis methodology of millimeter wave imagery in response to the range and direction of motion of a subject is the ability to evaluate images from multiple sources in real time in order to better authenticate the presence of objects-of-interest in the images. Motion is detected in the scene by comparing multiple successive images so that the detection process is enabled or disabled based on the comparison results. In addition, an evaluation of multiple successive images can determine and calculate the relative motion of any objects-of-interest including direction, velocity and classification of motion (e.g., stationary, moving, rotating in place). The imagery of the visible spectrum camera and the millimeter wave camera convert the imagery into digital form and store the imagery in a computer memory device.

Another particular advantage provided by the embodiments of the system and method for dynamically altering the analysis methodology of millimeter wave imagery in response to the range and direction of motion of a subject is the ability to calculate the location and size of objects-of-interest in video images in real time and then automatically base further detection methodology according to the results. In addition, image processing can be altered based on the calculated results including early termination of further analysis, more detailed further analysis, or the use of different analysis methodology including differing inspection criteria, programs, algorithms, settings and sensitivities.

Another particular advantage provided by the embodiments of the system and method is the ability to provide a means to selectively, automatically and intelligently indicate to subsequent computer software and algorithms the findings of the subject's distance, direction and relative motion so that the subsequent computer software and algorithms can adaptively use differing inspection criteria, programs, algorithms, settings and sensitivities when evaluating the image (e.g., for threat detection, weapons detection, or detection of other objects).

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 2:
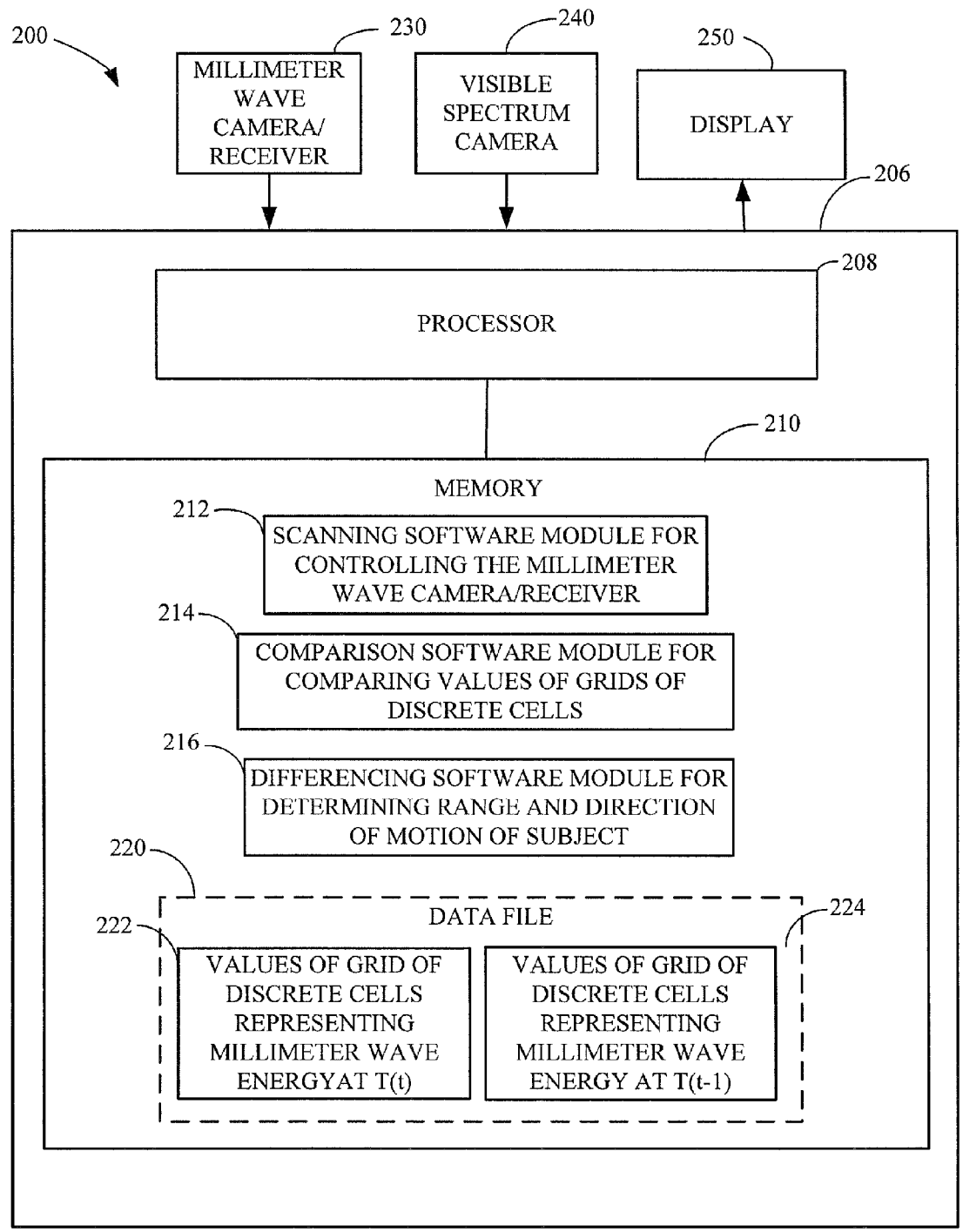
Figure 3:
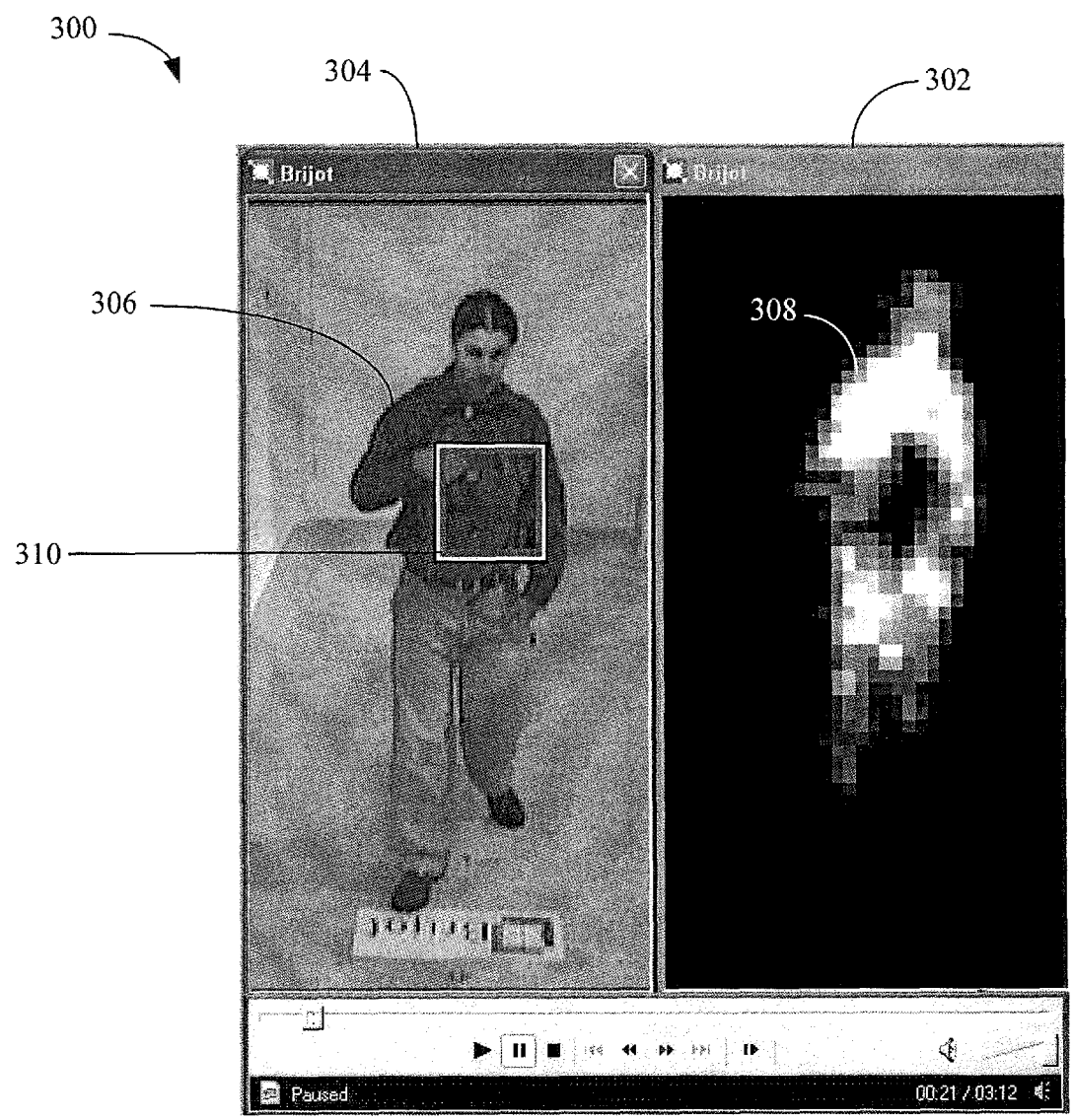

FIG. 1 is a flow diagram of a particular embodiment of a method for dynamically altering the analysis methodology of millimeter wave imagery in response to the range and direction of motion of a subject;

FIG. 2 is a block diagram of a particular illustrative embodiment of a system for dynamically altering the analysis methodology of millimeter wave imagery in response to the range and direction of motion of a subject; and FIG. 3 is a screen shot of a particular illustrative embodiment of the display generated by the method and system of dynamically altering the analysis methodology of millimeter wave imagery in response to the range and direction of motion of a subject.

VI. DETAILED DESCRIPTION

Millimeter wave cameras are detection devices that are operative to detect differences or contrast between millimeter wave energy (e.g., electromagnetic wave energy lying in the 80-100 GHz range) that is naturally emitted by the body of an individual and millimeter wave energy that is emitted, reflected, absorbed or otherwise attenuated by any object concealed on that individual. A standard visible spectrum video camera is operative to produce continuous dynamic images on a real-time basis that relate spatially and temporally to the millimeter wave imagery.

The millimeter wave imagery and the visible spectrum imagery may be shown side-by-side on a display having a graphical user interface (GUI). Alternatively, the millimeter wave contrast-based imagery may be combined with the images of the individual produced by the visible spectrum video camera to realize a set of composite images. The side-by-side images or composite images show both the individual being scanned and also any concealed object(s) revealed by the contrast-based imagery that was generated in conjunction with the millimeter wave cameras.

Software modules may implement instructions, which interface computer hardware, other software and external devices such as frame buffers, millimeter wave sensor controllers, hard disk drives and the like. Software modules may also be used to control, capture, digitalize and store the imagery from the visible spectrum camera and millimeter wave camera and to evaluate the resultant imagery, stored in a computer memory or other medium, as pixels.

In addition, the information contained in the image's pixels may be used to generate results of the presence/absence of a subject, the subject's distance and position, the presence and nature of relative motion, and the subject's direction of motion, as described below. These results are then communicated to subsequent image analysis software, programs and algorithms which can adaptively use differing inspection criteria, programs, algorithms, settings and sensitivities when evaluating the image.

In one implementation, the visible spectrum camera and millimeter wave camera view the same scene from slightly different positions and/or angles. When the cameras are viewing the same scene, feedback from the evaluation process performed on both images may be evaluated to further qualify the results. By way of example, when a subject is detected in both the visible spectrum camera image and the millimeter wave image, the probability that a subject has been detected is maximal. Conversely, when a subject is not detected in either the visible spectrum camera image or the millimeter wave image, the probability that a subject has been detected is minimal.

Another feature of the disclosed method relates to when a subject is detected within the boundary of the imaging zone. This feature of the method determines the position and distance of the subject relative to the cameras. The method operates by virtue of the positioning of the cameras, camera viewing angles, and camera optics including depth of field, optics magnification and other optical qualities. For example, normal optics and lenses exhibit varying magnification for objects at different distances from the lens. Accordingly, the apparent size of the objects changes with the distance from the camera so that objects close to the camera appear large, while similarly sized objects distant from the camera appear small. This characteristic of normal optics and lenses also causes the apparent shape of objects to vary with distance from the center of the field of view so that objects appearing close to the edges are viewed from an angle, while objects near the center of the field of view are viewed frontally.

By evaluating the location, size and shape of the subject, the method determines the position and distance of the subject relative to the cameras. Additionally, exploiting the fact that the visible spectrum camera and millimeter wave camera are non-coaxial (i.e., view the scene from differing positions and angles), a triangulation computation may be optionally performed to further increase the method's precision.

Yet another feature of the disclosed method is the comparison and evaluation of the relative motion of the current time frame camera images versus previous time frame images. This comparison and evaluation (i.e., "tracking") step calculates the relative motion of the subject between successive time frame images and determines the direction, velocity and classification of the subject's motion (e.g., stationary, moving, rotating in place).

Together, these features of the method determine the presence, location, size, and motion of a subject in visible spectrum camera and millimeter wave camera images. Empowered with this information, subsequent analysis software can make informed, real-time, automated decisions on the type of further analysis required, sensitivity changes required, and other valuable methodologies to employ for further image analysis.

For example, if the subject is determined to be far from the cameras and moving further, subsequent image analysis may be suspended to reduce false object detection events. If the subject is determined to be stationary before the cameras, motion filtering algorithms (algorithms that require threat detection on multiple successive frames before reporting an alarm) may be disabled. Alternatively, when the subject is determined to be stationary before the cameras, custom noise suppression and image enhancement algorithms may be invoked which analyze multiple frames of the stationary scene for image averaging, Gaussian noise reduction, software-based integration enhancement and/or other techniques. If a subject is extremely close to the cameras, special image processing may the invoked that does not evaluate the complete human form (which may be clipped and not contained in the image) but instead performs proprietary "zoomed" threat detection.

Referring now to FIG. 1, a particular illustrative embodiment of a method for dynamically altering the analysis methodology of millimeter wave imagery in response to the range and direction of motion of a subject is disclosed and generally designated 100. An initial value is assigned to the time factor, T, at 110. The variable, t, of the time factor, T, is initially assigned a value of 1 in this particular illustrative embodiment. Scanning an imaging zone is completed during a time frame, T(t), at 112, using a millimeter wave frequency radiometer.

The millimeter wave energy is received using pixels at 114, wherein the pixels correspond to a spatial position in the imaging zone at the current time frame, T(t). A grid of discrete cells is generated at 116 using calculated values that represent an amount of millimeter wave energy associated with at least one respective pixel. Algorithms may be used to resolve the pixels, recognizing contrast cells based on differences in millimeter wave energy.

The grid of discrete cells generated at the time frame T(t) is stored at 118 for comparison with at least one previously stored time frame at 120. The relative range and direction of motion of the subject is determined at 122 using the results of comparing the grid of the current time frame with the grid from at least one previous time frame. The millimeter wave energy radiated by the objects in the scene is dynamically processed using a CPU at 124 in response to detecting a range and direction of motion of a subject. In addition, optics and/or one or more curved reflectors may be used to further focus the millimeter wave energy. If determined at 126 (based on the results) that the subject is within or moving into a predetermined boundary of the imaging zone, the variable t is increased and the iterative process is repeated by scanning the imaging zone at 112 at time t=t+1. Algorithms may be used for detecting and recognizing the presence of a subject in the scene and to discern the subject's range and direction of motion relative to the millimeter wave camera. Algorithms may also be used to evaluate the results of the subject's range and motion and intelligently direct or change the subsequent detection methodology based on the analysis. For instance, if the subject's direction of travel is determined to be away from the camera and the range of the subject is determined to be at the maximum boundary of the imaging zone, the algorithms may decide to forgo additional detections or analysis.

A block diagram of a particular embodiment of a system for dynamically altering the analysis methodology of millimeter wave imagery in response to the range and direction of motion of a subject is disclosed and generally designated 200. In a particular embodiment, the system 200 may be configured to perform the methods depicted in FIG. 1. An imaging zone includes a predetermined boundary that may be, in a particular illustrative embodiment, illuminated with millimeter wave energy by an illuminator, which may be a projection optics device. One or more millimeter wave cameras are focused on the imaging zone to detect millimeter wave energy reflected from the imaging zone. One or more visible spectrum color video cameras may also be focused on the imaging zone. A means is provided for electrically communicating image signals between the visible spectrum video camera, millimeter wave camera, and a central processing unit device which receives and processes such signals. The millimeter wave images are synchronized with the video images to a substantially identical time base so that real-time composite images of the millimeter wave images and video images are generated.

The central processing unit device 206 includes at least one processor 208 and a memory 210 that is accessible to the processor 208. The processor controls subsequent analysis and dynamic processing of millimeter wave imagery in response to determining the range and direction of motion of the subject. Accordingly, the subsequent detection methodology can be directed or changed based on the previous analysis. The memory includes media that is readable by the processor 208 and stores data and program instructions of software modules that are executable by the processor 208, including a scanning software module 212 for controlling the scanning millimeter wave camera/receiver 230, a comparison software module 214 for comparing values from grids of discrete cells, a differencing software module for determining range and direction of motion of a subject, and a data file 220 that includes values from at least one grid each of discrete cells at T(t) 222 and at T(t−1) 224. A millimeter wave camera and receiver 230, a visible spectrum camera 240 and a display 250 are coupled to the device 206. In a particular embodiment, a graphical user interface coupled to the device 206 may include a keyboard, a pointing device, a touch screen, a speech interface, another device to receive user input, or any combination thereof.

With reference to FIG. 3, a particular embodiment of a video monitor for a system for dynamically altering the analysis methodology of millimeter wave imagery in response to the range and direction of motion of a subject is disclosed and generally designated 300. The millimeter wave imagery 302 is shown on one portion of the video monitor 300 and a corresponding visible spectrum image 304 is shown on a second portion of the video monitor 300. As explained above, the images 302, 304 are also stored onto a memory device such as hard disk drive. Each image 302, 304 is encoded with a time stamp indicating the absolute or relative time the image was acquired or references such information by way of a data file or database structure. Each image may also be encoded with other data such as threat presence/absence, threat highlights, sensitivity levels, analysis masks, etc. or this data can be stored into a data file or database structure. A computer-generated visual cue, such as a rectangle, defines an area of a threat that was detected on the image. For example, in FIG. 3, a rectangular box 310 shown in the video image 304, corresponds to a hidden object on the person 306 that is visible in the millimeter wave image 302. In addition to the integration and synchronization of visible color and millimeter wave imagery, the disclosed system and method could additionally and similarly integrate imagery from additional dissimilar sources such as x-ray, microwave, infra-red and ultra-violet imagers. In addition, the visible spectrum images and millimeter wave images may be displayed as overlays in the same window as a composite image with a user controlled opacity/translucency.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for dynamically altering the analysis methodology of millimeter wave imagery in response to the range and direction of motion of a subject, the method comprising:
    passively scanning an imaging zone of a scene using at least a first millimeter wave camera during a current time frame;
    calculating values of a grid of discrete cells representing the millimeter wave energy associated with the current time frame;
    comparing values from the grid of discrete cells representing the millimeter wave energy associated with the current time frame with values from a grid of corresponding discrete cells representing millimeter wave energy associated with a previous time frame;
    determining a current range and direction of the subject based on the comparing;
    dynamically processing millimeter wave imagery of the imaging zone in response to determining the range and direction of motion of the subject; and
    determining additional scanning of the imaging zone to be performed using the first millimeter wave camera responsive to the processing.

2. The method of claim 1, further comprising generating differencing results from the values of the grid of discrete cells associated with the current time frame with the values from a grid of corresponding discrete cells associated with a previous time frame.

3. The method of claim 2, further comprising using the differencing results in determining the current range and direction of the subject.

4. The method of claim 1, further comprising suspending scanning the imaging zone when the differencing results indicate that the subject is not within the imaging zone.

5. The method of claim 1, further comprising receiving the millimeter wave energy associated with the current time frame using pixels.

6. The method of claim 1, further comprising storing the values of the grid of discrete cells associated with the current time frame.

7. The method of claim 1, further comprising using optics or one or more curved reflectors to focus on the subject in response to detecting the range and direction of motion of the subject in the current time frame.

8. The method of claim 5, further comprising detecting an explosive object, threat object, contraband object, stolen object or otherwise concealed object using the pixels.

9. The method of claim 1, further comprising:
    receiving input signals from at least one video camera to generate real-time visible spectrum video images spatially and temporally relative to the millimeter wave imagery; and
    synchronizing the millimeter wave imagery with the video images to a substantially identical time base.

10. The method of claim 9, further comprising:
    combining the millimeter wave imagery and the video images to generate composite images of the millimeter wave imagery and video images; and
    displaying the composite images.

11. The method of claim 1, further comprising zooming in on a portion of the subject when the subject is at a predetermined range of the millimeter wave camera.

12. The method of claim 1, further comprising analyzing multiple successive time frames when determined the subject is stationary before the millimeter wave camera.

13. The method of claim 12, wherein the multiple successive time frames are analyzed using a Gaussian noise reduction motion method.

14. A system for dynamically altering the analysis methodology of millimeter wave imagery in response to the range and direction of motion of a subject, the system comprising:
    at least a first millimeter wave camera for passively scanning an imaging zone of a scene during a current time frame to generate millimeter wave imagery;
    a scanning software module for controlling the first millimeter wave camera;
    a grid of discrete cells representing the millimeter wave energy associated with the current time frame;
    a comparison software module for comparing values of the grid of discrete cells representing the millimeter wave energy associated with the current time frame with values of a grid of corresponding discrete cells representing the millimeter wave energy associated with a previous time frame to determine the current range and direction of the subject; and
    a processor for processing millimeter wave imagery of the imaging zone in response to determining the range and direction of motion of the subject and determining additional scanning of the imaging zone to be performed using the first millimeter wave camera responsive to the processing.

15. The system of claim 14 further comprising a display means for displaying the millimeter wave imagery of the current time frame.

16. The system of claim 15 further comprising a graphical user interface (GUI) to manage the displayed millimeter wave imagery.

17. The system of claim 16 further comprising a memory device for storing values of the grid of discrete cells representing millimeter wave energy at the current time frame.

18. The system of claim 17, wherein the memory device further adapted for storing values for at least one grid of discrete cells representing millimeter wave energy for at least one previous corresponding time frame.

19. The system of claim 14, further comprising a video receiver for receiving input signals received by at least one visible spectrum video camera to generate video images spatially and temporally relative to the millimeter wave imagery.

20. The system of claim 14, wherein the millimeter wave imagery further comprising a plurality of pixels.

* * * * *